United States Patent [19]

Gibson et al.

[11] 4,416,170

[45] Nov. 22, 1983

[54] METHOD OF PRODUCING A STEEL CAUL

[75] Inventors: Donald B. Gibson; Gerald F. Laughinghouse, both of Rock Hill, S.C.

[73] Assignee: Champion International Corporation, Stamford, Conn.

[21] Appl. No.: 479,106

[22] Filed: Mar. 28, 1983

Related U.S. Application Data

[60] Continuation of Ser. No. 288,644, Jul. 30, 1981, abandoned, which is a division of Ser. No. 201,715, Oct. 29, 1980.

[51] Int. Cl.³ .............................................. B21K 5/20
[52] U.S. Cl. ................................. 76/107 R; 156/219; 156/581; 428/687
[58] Field of Search .............................. 428/681–685, 428/687; 425/383, 385; 156/219, 581; 52/316; 249/114, 116, 187, 189, 104, 140; 427/292; 76/107 R, 101 R

[56] References Cited

U.S. PATENT DOCUMENTS

| 2,809,901 | 10/1957 | Bach | 427/292 |
| 3,526,558 | 9/1970 | Beeson | 156/219 |
| 3,718,496 | 2/1973 | Willard | 156/581 |
| 3,928,527 | 12/1975 | Wohnhaas | 156/219 |

OTHER PUBLICATIONS

Perry, R. H. et al., *Chemical Engineers Handbook*, 5th Ed., McGraw Hill, pp. 21–41, (1973).
Plaster, H. J., Blast Cleaning and Allied Process, vol. II, pp. 366–369, (1973).

*Primary Examiner*—Roscoe V. Parker
*Attorney, Agent, or Firm*—Evelyn M. Sommer

[57] ABSTRACT

A steel caul for forming wood panels is sandblasted to roughen the contact face thereof. The process of roughening the face results in a multiplicity of minute indentations in the surface of the face which function to capture and retain therein carbonized materials which are produced when the caul is employed to press panel products, thereby extending the period which the caul can be used without the need for cleaning carbon deposits from the same.

4 Claims, 3 Drawing Figures

U.S. Patent   Nov. 22, 1983   4,416,170
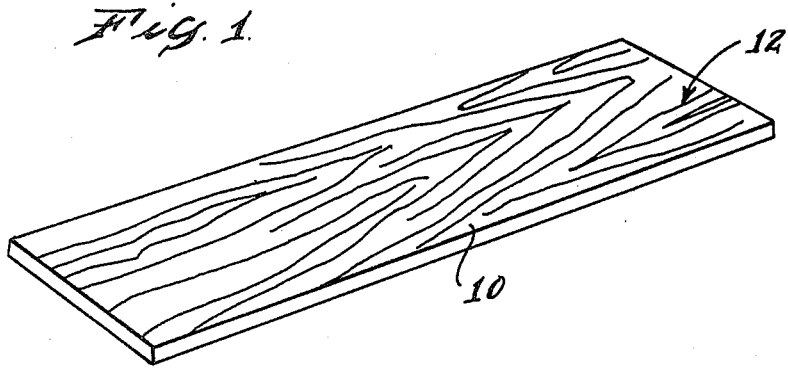
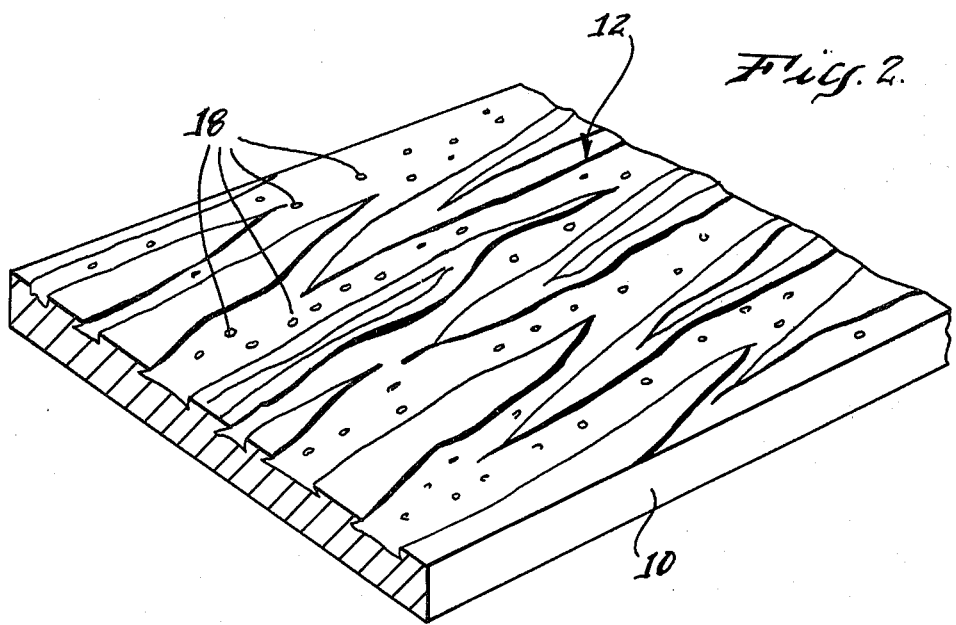
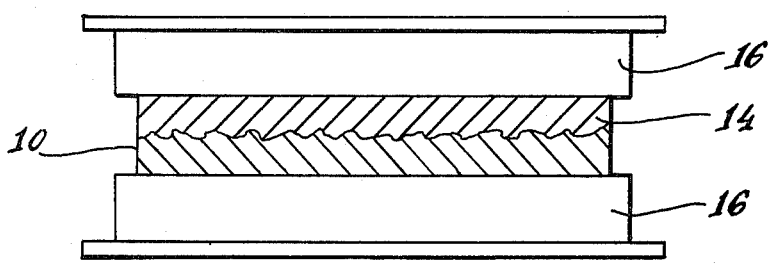

METHOD OF PRODUCING A STEEL CAUL

This application is a continuation of application Ser. No. 288,644, filed July 30, 1981, and now abandoned, which is a divisional of application Ser. No. 201,715, filed Oct. 29, 1980.

BACKGROUND OF THE INVENTION

This invention generally relates to the manufacture of reconstituted wood products in presses provided with removable cauls. This invention more specifically relates to the manufacture of hardboard and more particularly deals with an improved caul plate and process for producing the same which reduces the need for periodic cleaning of the plates thereby extending the service life of the same.

As a result of the heat required in the pressing process for manufacturing the reconstituted wood products, carbon is produced on the caul surface which eventually builds up upon repeated usage of the caul. This carbon buildup may be impressed into the panel product unless the caul is removed and cleaned. Frequent removal and cleaning of the cauls not only results in down time of the production press but also diminishes the useful life of the caul.

SUMMARY OF THE INVENTION

The present invention overcomes the deficiencies inherent in prior art type cauls by providing an improved caul construction and method for producing same which substantially minimizes the problems of carbon buildup mentioned previously. The surface of the face of the caul is roughened by sandblasting or the like to produce a desired surface roughness; however, such roughness is not sufficiently exaggerated to impair the quality of the resulting product. The surface roughening process results in a multiplicity of minute indentations in the surface of the caul face which function to capture and retain therein carbonized materials which are produced when the caul is employed to press panel products, thereby extending the time period which the caul can be used without the need for cleaning carbon deposits from the same.

BRIEF DESCRIPTION OF THE DRAWINGS

In the drawings, wherein like numerals are employed to represent like parts in the various views, and which forms an integral part of the invention and is to be read in conjunction therewith:

FIG. 1 is a perspective view of a steel caul plate produced in accordance with the present invention;

FIG. 2 is a partial, enlarged view of a portion of the face of a textured steel caul shown in FIG. 1 revealing the indentations in the surface of the face produced by the surface roughening process; and FIG. 3 is a side elevational view of the steel caul plate of FIG. 1 interposed along with a panel to be pressed between a pair of press platens.

DETAILED DESCRIPTION OF THE INVENTION

According to the present invention, a steel caul and method of producing the same are provided. Such cauls are used to provide a removable pressing surface to facilitate cleaning, repair and replacement so as to maintain the same degree of surface quality on the product being produced.

Referring now to FIG. 1, an improved steel caul 10 includes an upper planar surface 12 which includes texturing defining a decorative pattern, such as wood grain, to be embossed on the face of a wood panel 14 or the like.

The caul 10 comprises a steel plate embossed with a natural wood grain pattern or other desired pattern. The surface of caul 10 is then "roughened" in a manner hereinafter set forth.

One form of a caul utilizing the present invention is known as a "traveling caul". A "traveling caul" is one which is matched with individual wood panels (plywood, particleboard, hardboard, etc.) prior to hot pressing, pressed against the wood panels under heat and pressure, and then separated from the wood panels (after each hot-press cycle) for reuse.

Cauls formed with the present invention are particularly useful in forming what are known as stationary or "hanging cauls". A "hanging" caul is one which is mechanically suspended within a hot press opening. In this manner of operation, the need for matching with and then separating the cauls from the individual panels for each hot press cycle as with the traveling caul is eliminated. Because typical hot press designs restrict the methods available for suspending the caul within the press openings, "hanging" cauls ordinarily have excellent stiffness at relatively high (300° F.–475° F.) press temperature.

Steel caul 10 may be used in transferring the decorative design on the embossing face 12 thereof to a panel product 14 as shown in FIG. 3. This is performed by inserting the steel caul 10 and the panel 14 between a pair of hot press platens 16 with the embossing face 12 contacting the surface of the panel 14 onto which the design is to be embossed. The steel caul 10 and panel 14 are then compressed between the platens 16 under heat and pressure to transfer the textured design on the embossing face 12 of the caul 10 to the panel 14. A releasing agent may be applied to the caul face 12 of the steel caul 10 or to the surface of the panel 14 to facilitate separation of the caul 10 from the panel 14.

As a result of the relatively high temperatures which are employed during the compression of the caul 10 and the panel 14, the releasing agent and/or other products are carbonized to some extent and result in carbon deposits which build up on the caul face 12 of the steel caul 10. Carbon buildup on the caul eventually results in degradation of the quality of the surface which is imparted to the product being produced. Consequently, in the past, the cauls had to be cleaned by scraping the carbon from faces thereof.

The present invention involves the recognition of the fact that if the face 12 of the steel caul 10 is "roughed-up" as shown in FIG. 2, the caul surface has the ability to hold on to build-up of carbon deposits created during the pressing process for a greater number of press cyclings than could otherwise be realized from cauls whose faces 12 have not been so roughened. The roughening process may be carried out by sandblasting the surface 12 which creates a multiplicity of minute, randomly oriented indentations 18 in the caul 10 which provides roughness in the caul surface 12 that functions to capture and retain carbonized materials therein. For best results, the sandblasting sand should be number 12-35 which indicates that it will all pass through a number 12 Tyler screen and all be retained on top of a number 35 Tyler screen. Smaller and larger sand particles can be used but are not as effective. Those skilled in the art will appreciate that various other processes may be employed to achieve the desired surface roughness. Preferably, the surface roughness of the caul face 12 created by the roughening process will be such that the roughness does not have a detrimental effect on the finished product such as a visible reflection on the finished product surface.

Surprisingly, the surface roughening process described above resulting in the desired roughness of the face 12 does not significantly affect the resulting quality of the textured, or embossed pattern which is imparted to the panel 14. Controlled experiments using both ordinary cauls and surface roughened steel cauls produced in accordance with the present invention substantiate the fact that the roughened steel cauls could be utilized in processing a substantially greater number of panels without the need for cleaning thereof compared to the ordinary prior art cauls. For example, during one controlled experiment, a caul which was roughened by sandblasting was employed in a production press to produce panels of high quality for a period of 26 days without cleaning carbon deposits from the surface thereof, while ordinary cauls having essentially smooth surfaces employed in identical production presses operating under the same pressure and temperature conditions had to be removed on three different occasions for cleaning the carbon deposits therefrom. Thus, the experimental caul ran three times as long as the ordinary control cauls. In another controlled experiment, two sandblasted cauls were installed into a production press along with eighteen other ordinary control cauls. The eighteen control cauls had to be replaced once during the experiment while the experimental cauls produced acceptable panels throughout the experiment without the need for a single cleaning thereof.

Each of the experimental cauls roughened by sandblasting which were employed in the above-mentioned experiments were subsequently cleaned; it was found that neither the cleaning of these cauls nor the extended time which such cauls were used in production presses without cleaning resulted in any alteration of the caul surface thereof, nor in the quality of panels which were subsequently produced thereby.

It was unexpectedly discovered that by sandblasting the caul face with number 12-35 sand to "roughen" the face plate of the steel caul that the caul could be used for as long as three weeks without the detrimental carbon build-up. This unique and remarkable discovery results in unexpected benefits by saving a large amount of time normally lost in shut down of the operations as well as saving man power required in normal cleaning of the carbonized cauls since, under normal conditions, the cauls had to be cleaned at least weekly. It is believed that the carbon build-up is held or bonded (better adhesion) more securely to the caul face because of the indentations caused by the sandblasting. Therefore the carbon build-up is less likely to "flake" off during pressing than with a smooth surface. Thus, highly beneficial and unexpected results are obtained with the present invention.

From the foregoing, it can be appreciated that the present invention substantially increases the number of times cauls may be cycled in production presses without the need for replacing the same or cleaning the carbon deposits therefrom. It is recognized that various processes might be employed to produce the necessary roughness of the surface of the cauls, including various chemicals and mechanical techniques. Thus, it is recognized that those skilled in the art may make various modifications or additions to the preferred embodiment chosen to illustrate the invention without departing from the gist and essence of the present contribution to the art. Accordingly, it is to be understood that the protection sought and to be afforded hereby should be deemed to extend to the subject matter claimed and all equivalents thereof fairly within the scope of the invention.

What is claimed is:

1. A process for forming a steel caul to use in forming panel surfaces on panels made of reconstituted wood by pressing said cauls against said reconstituted wood at temperatures of up to about 475° F., said process comprising the steps of:
   a. selecting one face of said caul to form said panel surfaces,
   b. forming a decorative pattern on said selected face, said decorative pattern being adapted to be pressed against the reconstituted wood panels to form the panel surfaces on said panels, and
   c. thereafter, roughening the decorative pattern formed on the selected face of said steel caul by sand blasting said face with number 12-35 sand thereby forming a multiplicity of indentations in said decorative pattern on said selected face said indentations being large enough to capture and retain the carbon materials produced by the use of said caul in forming said panel surfaces, but not being so large as to have a visibly noticeable detrimental effect on the said decorative pattern in said selected face.

2. A process as in claim 1 further comprising the step of smoothing said one face prior to roughening.

3. A process as in claim 1 further comprising the step of embossing said face with a decorative design prior to roughening.

4. A method as in claim 1 further including the step of forming said indentations in a random orientation.

* * * * *